United States Patent [19]

Lee et al.

[11] Patent Number: 5,727,097

[45] Date of Patent: Mar. 10, 1998

[54] PULL-PROOF FIBER OPTIC ARRAY CONNECTOR

[75] Inventors: Nicholas A. Lee, Woodbury; Gordon D. Henson, Lake Elmo, both of Minn.

[73] Assignee: Minnesota Mining and Manufacturing Company, St. Paul, Minn.

[21] Appl. No.: 660,296

[22] Filed: Jun. 7, 1996

[51] Int. Cl.⁶ .................................................. G02B 6/40
[52] U.S. Cl. .............................. 385/58; 385/65; 385/71; 385/114
[58] Field of Search ................................. 385/58, 59, 65, 385/71, 83, 114, 84

[56] References Cited

U.S. PATENT DOCUMENTS

| | | | |
|---|---|---|---|
| 3,864,018 | 2/1975 | Miller | 65/408 |
| 3,871,935 | 3/1975 | Gloge et al. | 156/158 |
| 3,920,432 | 11/1975 | Smith | 385/98 |
| 4,023,887 | 5/1977 | Speers | 350/96 C |
| 4,289,558 | 9/1981 | Eichenbaum et al. | 156/179 |
| 4,515,434 | 5/1985 | Margolin et al. | 385/65 |
| 4,715,677 | 12/1987 | Salto et al. | 385/50 |
| 4,784,457 | 11/1988 | Finzel | 350/96.21 |
| 4,793,683 | 12/1988 | Cannon, Jr. et al. | 385/60 |
| 4,900,126 | 2/1990 | Jackson et al. | 385/114 |
| 4,980,007 | 12/1990 | Ferguson | 385/59 |
| 5,166,995 | 11/1992 | Briggs et al. | 385/59 |
| 5,208,889 | 5/1993 | Cedrone et al. | 385/114 |
| 5,259,050 | 11/1993 | Yamakawa et al. | 385/59 |
| 5,276,755 | 1/1994 | Longhurst | 385/88 |
| 5,287,426 | 2/1994 | Shahid | 385/85 |
| 5,309,537 | 5/1994 | Chun et al. | 385/59 |
| 5,327,513 | 7/1994 | Nguyen et al. | 385/114 |
| 5,390,268 | 2/1995 | Morlion et al. | 385/59 |
| 5,420,952 | 5/1995 | Katsura et al. | 385/80 |
| 5,430,819 | 7/1995 | Sizer, II et al. | 385/59 |
| 5,500,914 | 3/1996 | Foley et al. | 385/77 |
| 5,574,817 | 11/1996 | Henson et al. | 385/114 |

FOREIGN PATENT DOCUMENTS

| | | |
|---|---|---|
| 0 613 031 A1 | 8/1994 | European Pat. Off. . |
| 5-165434 | 1/1995 | Japan . |
| WO 86/01306 | 2/1986 | WIPO .................. G02B 6/38 |

OTHER PUBLICATIONS

Alcoa Fujikura Ltd. Technical Brochure, Feb. 1995.
AT&T Multifiber Optical Cable Assemblies Product Catalog, Sep. 1993.
MACII™ Connector Family Technical Overview, pp. 83–88, no date.

Primary Examiner—John D. Lee
Assistant Examiner—Ellen E. Kang
Attorney, Agent, or Firm—H. Sanders Gwin; Nestor F. Ho

[57] ABSTRACT

The present invention is a fiber optic cable connector for providing a low cost connector that provides strain relief to optical fibers without compromising an optical coupling. The cable connector has a connector body that has front and back ends. The front end of the cable body has a pair of latching members extending therefrom and a mounting post that also extends therefrom. The back end of the connector body is tapered to form a cable transition member. A connector body cover is provided to protect optical fibers residing between the connector body and the body cover. A fiber alignment block, or ferrule, is provided that has a fiber receiving surface for receiving at least one optical fiber and a connector body engagement surface and an optical interface surface. A plurality of alignment grooves are formed in the receiving surface for aligning the at least one optical fiber. The connector body engagement surface of the ferrule includes a receiving cavity for receiving the mounting post of the connector body.

3 Claims, 6 Drawing Sheets

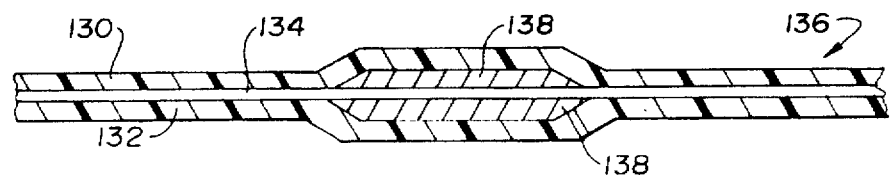
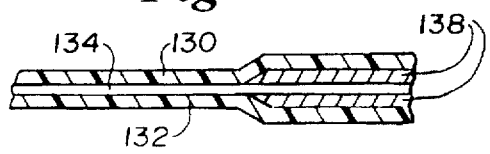
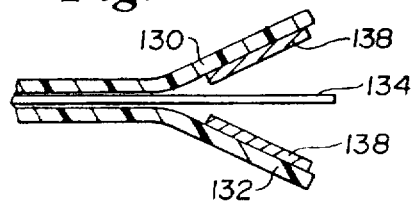
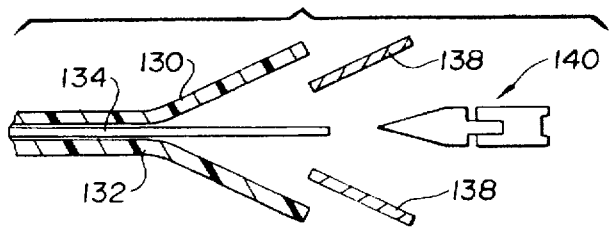
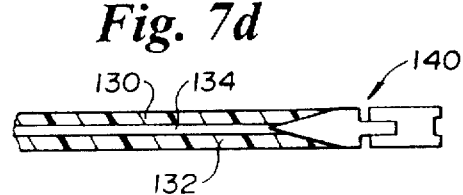
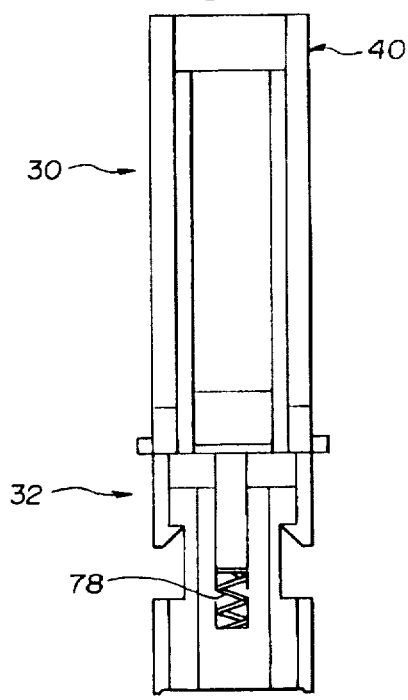
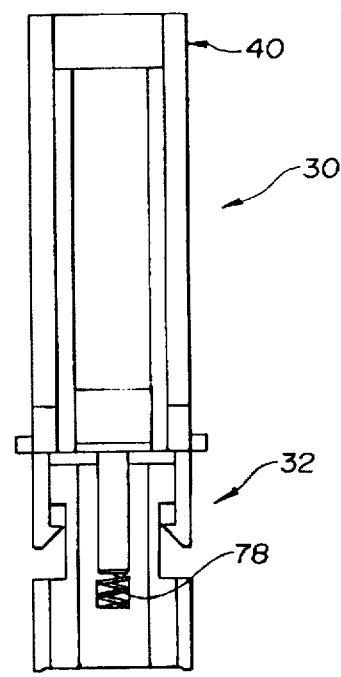

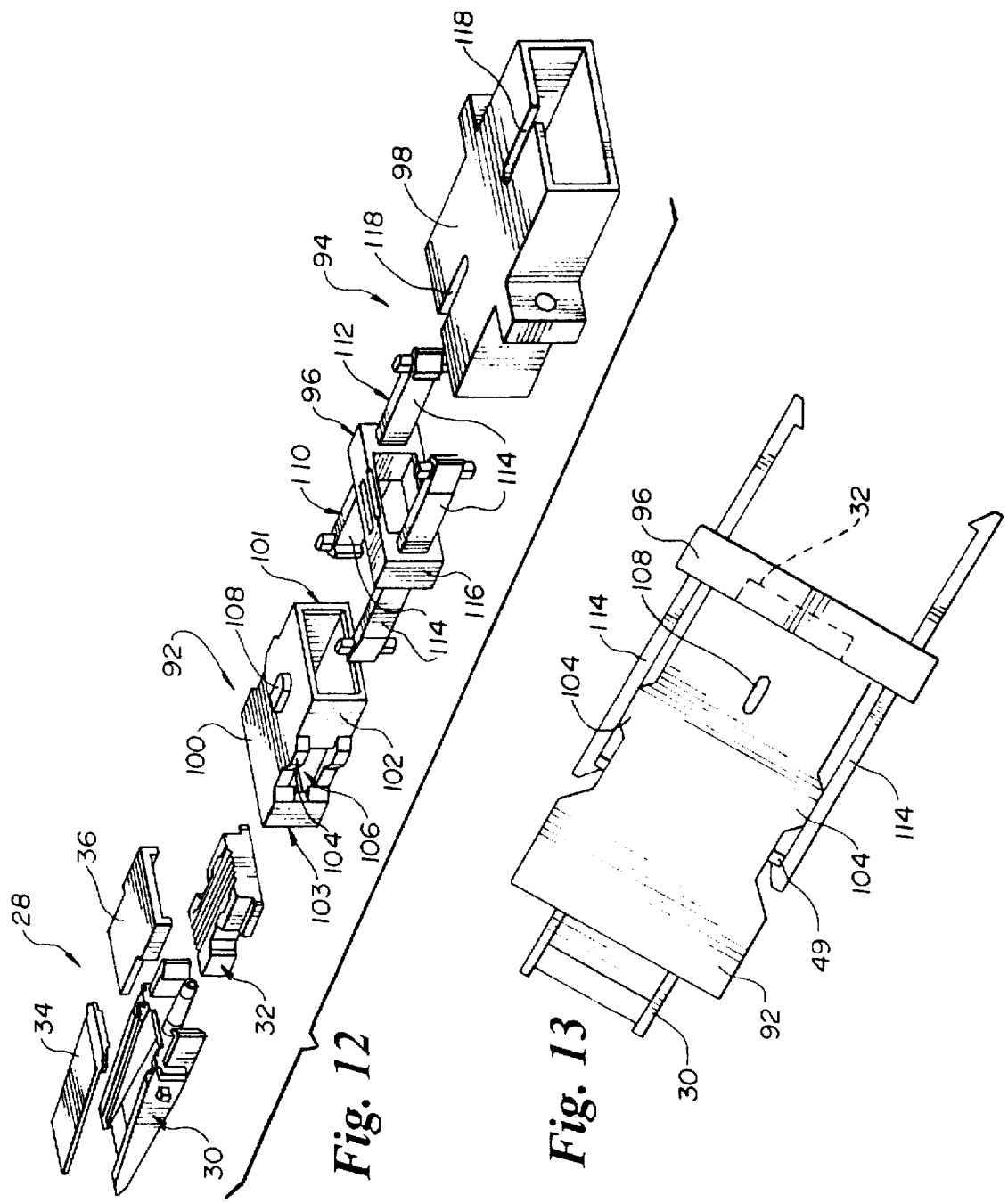

PULL-PROOF FIBER OPTIC ARRAY CONNECTOR

RELATED APPLICATIONS

The present invention is related to U.S. patent application Ser. No. 08/544,611, Filed Oct. 18, 1995, now patented, U.S. Pat. No. 5,611,017, issue date Mar. 11, 1997, entitled Fiber Optic Ribbon Cable With Pre-Installed Locations For Subsequent Connectorization; and co-pending U.S. patent application Ser. No. 08/456,571, now patented, U.S. Pat. No. 5,574,817, issue date Nov. 12, 1996, entitled Fiber Optic Ribbon Cable Assembly and Method of Manufacturing Same, the disclosures of which are herein incorporated by reference in this application.

FIELD OF THE INVENTION

The present invention relates generally to connectors for optical fibers. In particular, the present invention relates to a Pull-Proof Fiber Optic Array Connector wherein the optical fibers provide strain relief.

BACKGROUND OF THE INVENTION

Optical fiber ribbon cables are well known for the transmission of optical signals. Use of optical cables, including optical fiber ribbon cables, has generally been limited to long haul trunking installations where the improved transmission characteristics of the optical fibers justify the greater expense and difficulty associated with their manufacturing and installation. As the demands on communication media continue to increase, the advantages of using optical cable for transmission of signals across shorter distances, or for interconnecting local devices, continues to grow. With this growth has come the need to connect fiber optic ribbon cables to a multiplicity of devices.

Numerous optical cable connectors have been introduced within the past few years. Examples of known multi-fiber connectors include those available from Berg Electronics under the trade designation MAC, and those avialable from US Conec under the trade designation MT. Further examples of optical connectors are illustrated in U.S. Pat. Nos. 5,420,952 to Katsura, et al.; 5,276,755 to Longhurst; 5,500,915 to Foley, et al.; 4,784,457 to Finzell; 5,430,819 to Sizer II, et al.; and 5,287,426 to Shahid.

Many of the known connectors are equipped with strain relief features. For example, the Longhurst, U.S. Pat. No. 5,276,755 discloses a multipart optical fiber connector having a connector body connected to a plurality of optical fibers via a separate strain relief member.

Without proper strain relief, optical fibers in a connector may be easily damaged. Often times, the damage is not readily apparent, and in fact, the damage may be of a type that does not manifest itself for weeks, months or years. Standard strain relief members typically provide some protection from bending, and also provide protection from torsional or axial forces. However, many of the known strain relief members are secured to the connector such that when an axial force is applied to the cable, the connector is pulled away from the coupled device thus destroying the coupling integrity. Additionally, when the axial force is removed, the fibers on the face of the connector are often times chipped and damaged as a result of the connectors smashing into one another.

Connectors do exist which strain-relief the fibers without compromising the optical coupling, but these connectors require separate strength members within the body of the cable in order to perform their function, thus adding cost. While the known optical connectors fulfill the need for coupling optical devices, there exists a need for a connector that provides strain relief to the fibers without compromising the optical coupling and without adding significant cost.

SUMMARY OF THE INVENTION

The present invention is a fiber optic cable connector that satisfies the existing need for providing a low cost connector that provides strain relief to optical fibers without compromising the integrity of an optical coupling. The cable connector has a connector body that has front and back ends. The front end of the connector body has a pair of latching members extending therefrom and a mounting post that also extends therefrom. The back end of the connector body is tapered to form a cable transition member. A connector body cover is provided to protect optical fibers residing between the connector body and the body cover. A fiber alignment block, or ferrule, is provided that has a fiber receiving surface for receiving at least one optical fiber. A plurality of alignment grooves are formed in the receiving surface for aligning the at least one optical fiber. The ferrule includes a connector body engagement surface and an optical device interface surface. The connector body engagement surface of the ferrule includes a receiving cavity for receiving the mounting post of the connector body. The receiving cavity of the ferrule also includes a spring.

In the preferred embodiment of the present invention, the connector body has a recessed floor which creates a fiber chamber between the connector body cover and the floor. The combination of the spring loaded ferrule and the fiber receiving chamber help provide a pull-proof connector assembly by allowing the ferrule to retract relative to the connector body, thus isolating the ferrule from external forces applied to the body.

BRIEF DESCRIPTION OF THE DRAWINGS

FIG. 6 is a cross-sectional view of a ribbon cable for field connectorization.

FIGS. 7(a)–7(d) are cross-sectional views of a method of field installation of a connector assembly according to the present invention.

FIGS. 8(a) and 8(b) are top plan views of a connector body and ferrule mated together in accordance with the present invention.

FIG. 12 is an exploded perspective view of a connector body and ferrule of the present invention along with a latching shell, a latching mechanism and a coupling housing.

FIG. 13 is a perspective view of a partially assembled connector assembly according to the present invention.

DETAILED DESCRIPTION OF THE INVENTION

Figure 1:
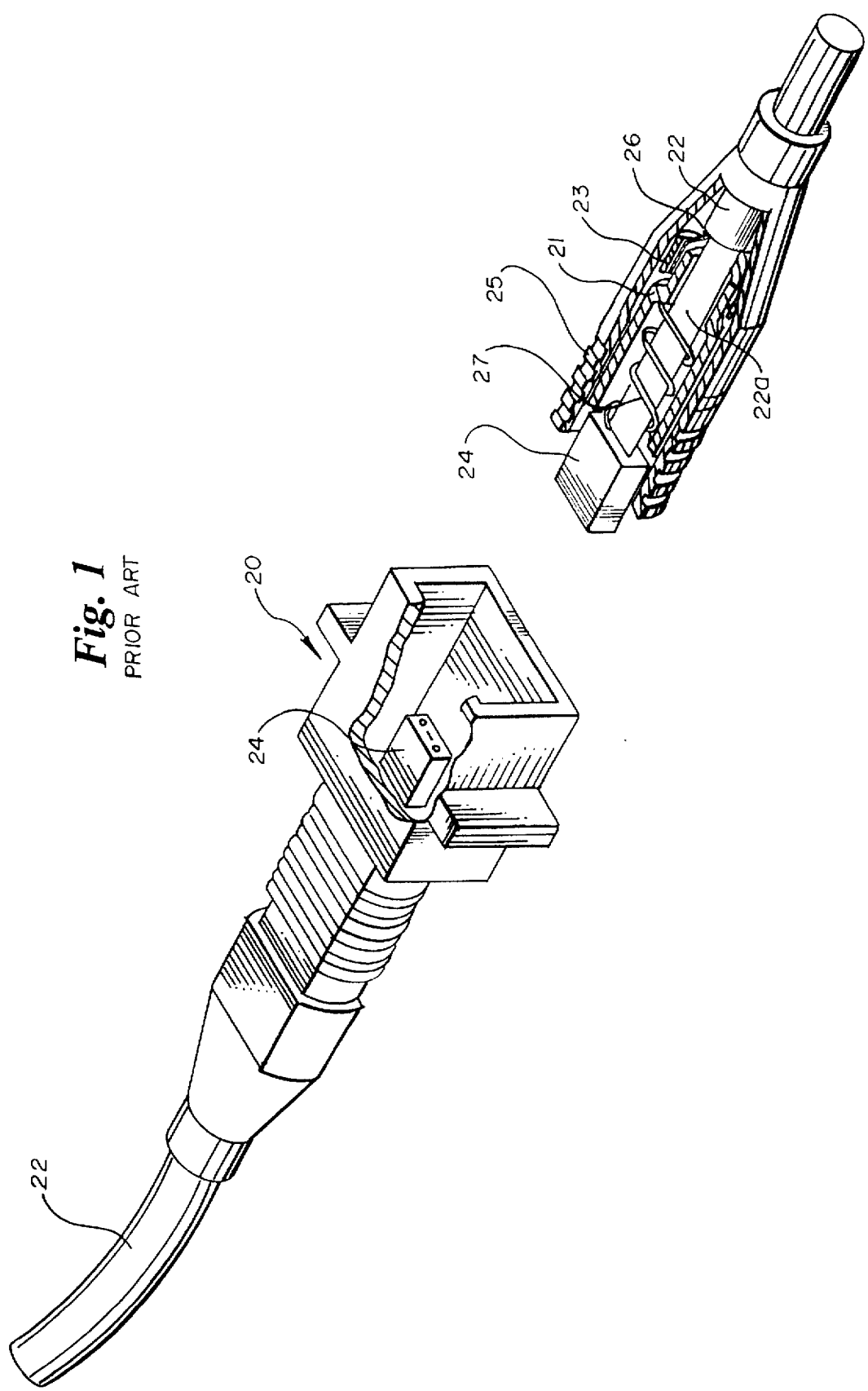
FIG. 1 is a figure of a prior art multi-fiber optical connector.

The present invention is directed to a fiber optic cable connector assembly that provides strain relief by the fibers themselves without needing a separate strain relief member. As discussed in the background section, there are many known optical fiber connectors having strain relief members. One such example is illustrated in FIG. 1. As illustrated in FIG. 1, a mating connector 20 is provided for mating first and second optical cables 22. Ferrules 24 are provided and are connected to optical fibers 22a. Strain relief members 26 are provided inside of cable 22 and typically run longitudinally down the length of cable 22. These strain members 26 are usually braided Kevlar® (Dupont) fibers which serve to increase the tensile strength of the entire length of the cable as well as providing tensile strain relief to the connectors at the cable ends. Strain members 26 are usually bonded to a connector body 21 by a crimp ring 23 or other like feature. Ferrule 24 is provided with a spring 27 and is allowed to float relative to the body 21, thus in essence, providing a strain relieved connection. In the present invention the need for an additional strength member within the cable is eliminated. This is possible because the combined strength of the fibers is high enough to provide adequate tensile strain relief. In typical installations, the optical fibers are weakened by the various stripping procedures required when installing a fiber optic connector. Since the connector assembly of the present invention can be applied directly over the fibers in the cabling process, as described below and in the related co-pending applications, these stripping procedures are unneeded.

Figure 2:
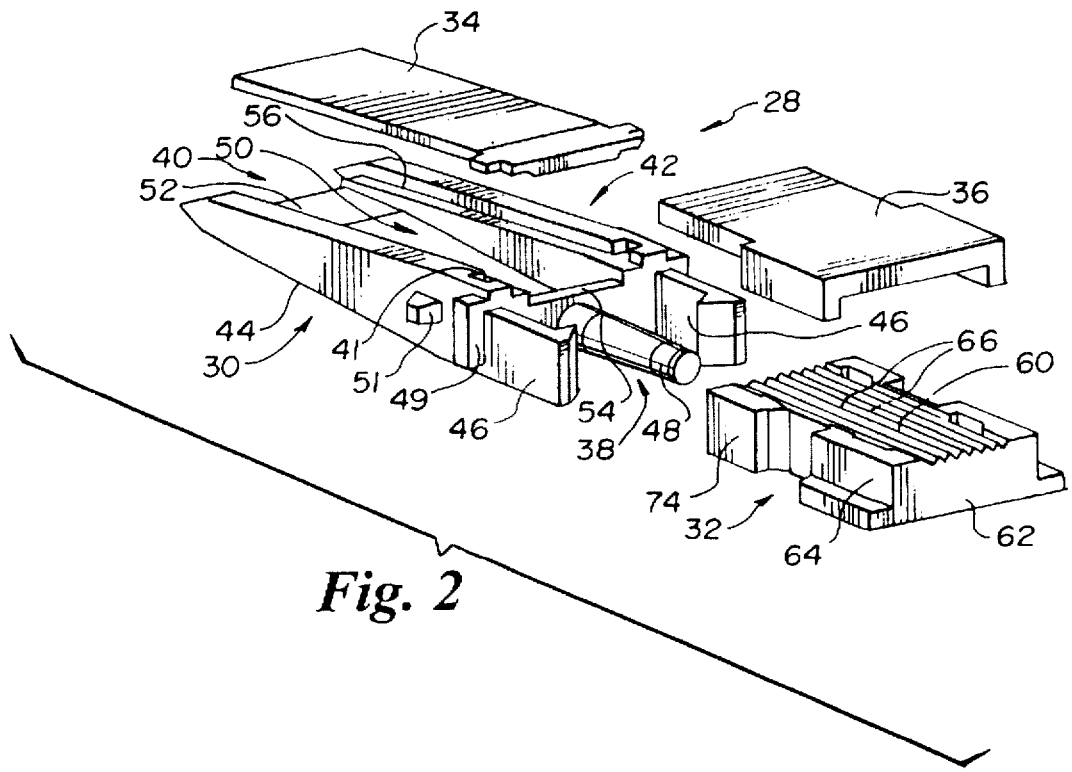
FIG. 2 is an exploded perspective view of a connector body and alignment block, or ferrule, with cover plates according to the present invention.

The present invention is illustrated perspectively in FIG. 2. A fiber optic cable connector assembly is illustrated generally at 28 having a connector body 30 and a fiber alignment block, or ferrule, 32. Connector body 30 is provided to transition optical fibers from an optical fiber cable to ferrule 32. Ferrule 32 on the other hand, is provided to align the optical fibers and to directly interface with other like ferrules or with a number of different light-emitting components such as LEDs, laser arrays, edge-emitting lasers, superluminescent diodes, vertical cavity surface emitting lasers (VCSELs) and other surface emitting devices. Additionally, ferrule 32 may interface with a number of different opto-electronic detectors. In the preferred embodiment of the present invention, a connector body cover 34 and a ferrule cover 36 are provided, for protecting optical fibers positioned there beneath. It should be noted, however, that covers 34 and 36 could be eliminated without departing from the spirit or scope of the invention. In the preferred embodiment of the present invention connector body 30 is made of plastic and ferrule 32 is made of ceramic. However, it should be noted that either or both of the connector body 30 and ferrule 32 could be manufactured from ceramic, plastic, metal or other materials without departing from the spirit or scope of the invention.

Figure 3:
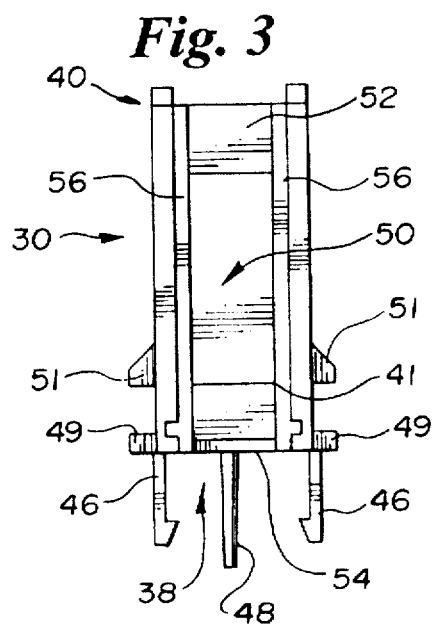
FIG. 3 is a top plan view of the connector body of FIG. 2.

Connector body 30 has a front end 38, a back end 40, a top portion 42 and a bottom portion 44 (not seen). As can be seen in additional detail in FIG. 3, latching arms 46 extend from front end 38 at the outer periphery of connector body 30. Extending from the center of front end 38 is a mounting post 48. As can be seen in FIG. 2, connector body 30 tapers from front end 38 to back end 40 and begins to taper at bevel line 41. Tapered back end 40 provides for a gentle transition from a fiber optic ribbon cable to the connector body. Projecting substantially perpendicular to the longitudinal axis of connector body are retention members 49 and stops 51, the purposes of which will be described in detail below.

Top portion 42 has a recessed floor 50 which is best seen in FIG. 2. Recessed floor 50 has a rear transition platform 52 and a front lip 54. A raceway 56 is also provided on top portion 42 for receiving connector body cover 34. Raceway 56 is provided such that when connector body cover 34 is mounted on to connector body 30, connector cover 34 is flush with the top of connector body 30. This is important for reasons that will be evident below.

Figure 4:
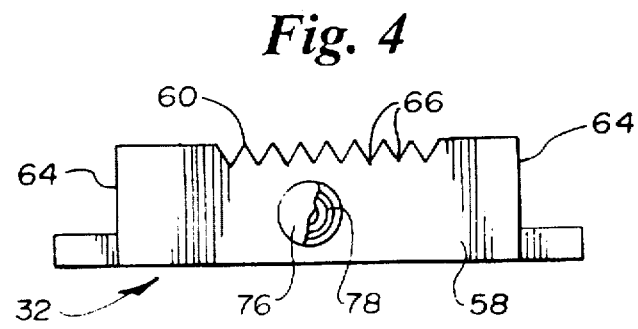
FIG. 4 is a rear elevation view of the ferrule of FIG. 2 with a portion cut away.
Figure 5A:
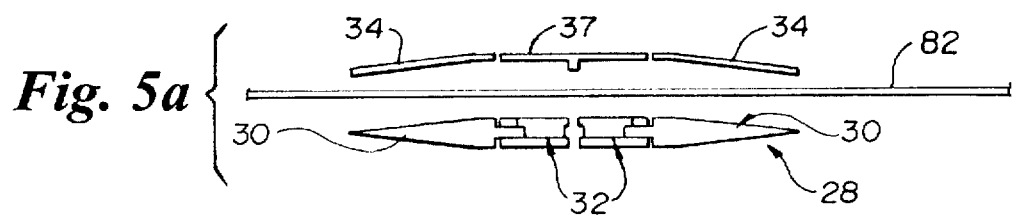
FIGS. 5(a)–5(f) are side views, with adhesive tape layers shown in cross-section, of a method of manufacturing a fiber optic ribbon cable having a connector body and ferrule according to the present invention.
Figure 5B:
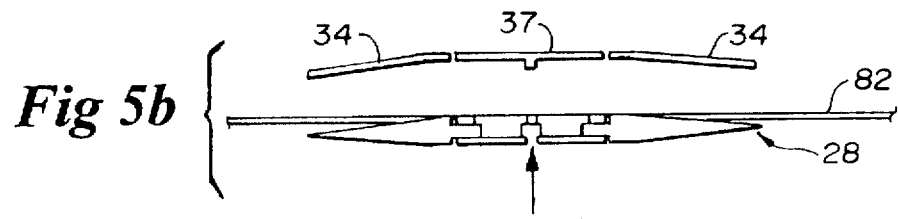
Figure 5C:
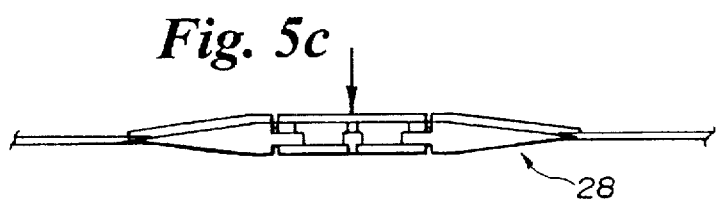
Figure 5D:
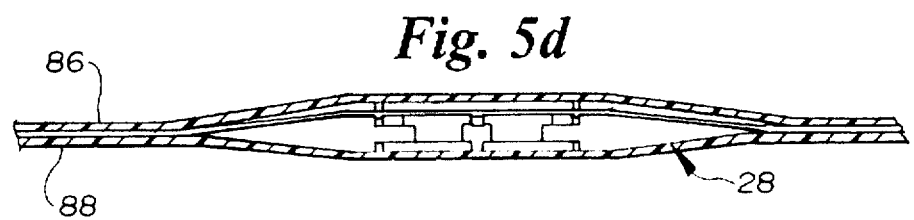
Figure 5E:
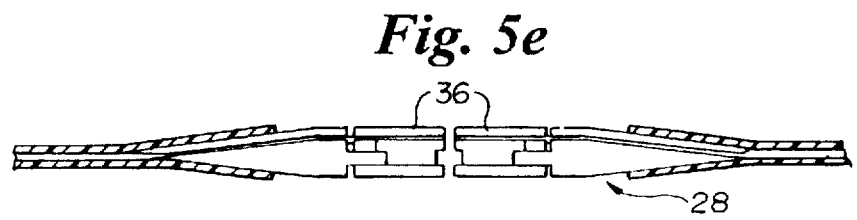
Figure 5F:
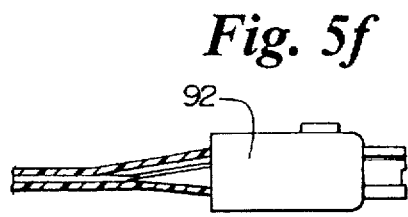

Ferrule 32, as illustrated in FIGS. 2 and 4, has a connector body engagement surface 58 (not seen in FIG. 2), an optical fiber engaging surface 60, an optical device interface surface 62 and sides 64. A plurality of alignment grooves 66 are formed in fiber engagement surface 60 for aligning optical fibers. In the preferred embodiment of the present invention, grooves 66 are V-shaped, however, other cross-sectional shapes could be chosen such as semi-circular or rectangular without departing from the spirit or scope of the present invention.

Sides 64 of ferrule 32 contain latching ears 74 for engagement with latching arms 46 of connector body 30. As can be seen in FIG. 4, ferrule 32 also contains a receiving cavity 76 in connector body engagement surface 58. A spring 78 is mounted inside of receiving cavity 76 to spring load ferrule 32 with respect to connector body 30 such that the assembly is pull-proof, as will be described in detail below. Alternative arrangements of a spring are also considered within the spirit and scope of the present invention such as a washer-style spring positioned on mounting post 48.

FIGS. 5(a)–5(f) illustrate an assembly process of a fiber optic ribbon cable having connector body 30 and ferrule 32 installed thereon. The present invention will be described with reference to a multi-fiber ribbon cable 80, but it should be understood that the present invention could also apply to single fiber cables as long as the single fiber was strong enough to provide strain relief. As illustrated in FIGS. 5(a)–5(f), at least one optical fiber 82 is drawn from a corresponding spool (not shown) which holds optical fibers. In the preferred embodiment of the present invention, optical fibers 82 are TECS™ hard clad fiber FT-200-EMA, available from 3M Company, St. Paul, Minn., however, it should be noted that fiber optic cables utilizing a variety of different optical fibers would also be acceptable.

An array of fibers are positioned over a pair of connector assemblies 28 each comprising a connector body 30 and a ferrule 32. The connector pair is then brought into contact with the fiber array. Connector body covers 34 and ferrule covers 36 are then brought into contact with the fiber array and the connector assemblies. In the embodiment illustrated, there are two separate connector body covers 34 and a dual ferrule cover 37, which when cut in half forms two individual ferrule covers 36. At this point, the covers are bonded in place and optical fibers 82 are bonded to transition platform 52 of connector body 30, and fibers 82 are also bonded in grooves 66. In an alternative embodiment, prior to bonding the covers in place, optical fibers 82 may be bonded to transition platform 52 of connector body 30 and in grooves 66. The bonding materials used in the present invention are commonly known, such as multi-part epoxy, or a light curing adhesives such as those available from ABLESTIK under the trade designation Luxtrak LCR 0603B+UV. Fibers 82 may also be potted in grooves 66 near interface surface 62 for ease of polishing the fibers.

After covers 34 and 37 are properly positioned, upper and lower adhesive tape layers, 86 and 88, respectively, are provided to sandwich optical fibers 82 therebetween creating fiber optic ribbon cable 80. A pair of compression rollers (not shown) are preferably used to supply the force necessary to secure upper and lower adhesive tape layers 86 and 88 with optical fibers 82 therebetween. Where present, connector body 30 and ferrule 32 are also sandwiched between upper and lower adhesive tapes 86 and 88. Upper and lower tape layers 86 and 88 are each three layer planar tape assemblies comprised of an inner-encapsulating layer, an adhesive layer and an outer protective layer. The encapsulating layer serves to encapsulate the fibers and is preferably comprised of a deformable material such as a pressure-sensitive adhesive, thermoset adhesive, thermal plastic adhesive, radiation curable adhesive, gel, foam, fibrous material, deformable plastic or any combination thereof. The adhesive layer is interposed between the inner layer and the outer layer and is preferably comprised of a material such as pressure-sensitive adhesive, thermoset adhesive, thermal plastic adhesive, radiation curable adhesive, mechanically interlocking structures or any combination thereof. The outer protective layer serves as the outer jacket for the fiber optic ribbon cable and is preferably comprised of vinyl or plastic material which is suitable for a variety of environmental applications or may be comprised of plastic, metal, fabric or any combination thereof. For a more detailed description of the method of making a ribbon cable, reference should be made to applicants' U.S. Pat. No. 5,574,817 entitled: Fiber Optic Ribbon Cable Assembly and Method of Manufacturing Same, the disclosure of which is hereby incorporated by reference.

The connector assembly is thus encapsulated in tape layers 86 and 88 in a continuous run of fiber optic cable 80. Tape layers 86 and 88 are then peeled back approximately to bevel line 41 exposing the connector pair, dual ferrule cover 37 and a portion of both connector body covers 34. The purpose for peeling back tape layers 86 and 88 is to allow the ferrule and ferrule cover to fit into a latching shell 92, as will be described and illustrated below. After peeling back tape layers 86 and 88, dual ferrule cover 37 and the fiber array are cut with a diamond saw. Severed ferrule cover 36 and the fiber array are then polished flush with optical device interface surface 62.

Connector body 30 and ferrule 32 of the present invention could also be field installed. For a detailed description of ribbon cables prepared for field installation and methods of field installation, reference should be made to applicants' U.S. Pat. No. 5,611,017, Filed Oct. 18, 1995, entitled Fiber Optic Ribbon Cable With Pre-Installed Locations For Subsequent Connectorization, the disclosure of which is herein incorporated by reference.

In a field installable application, a fiber optic ribbon cable having access points manufactured in line with the ribbon cable so as to provide a simple access point to the fibers for installing a connector thereon is provided. As illustrated in FIG. 6, a pair of adhesive tape layers 130 and 132 are provided about optical fibers 134 to create a fiber optic ribbon cable 136. At least one release element 138 is provided between the adhesive tape layers and the optical fibers at one or more access points along the ribbon cable to allow easy access to the fibers therein. By having the access points manufactured in line with fiber optic ribbon cable 136, the resulting ribbon cable is much easier to connectorize in the field.

FIGS. 7(a)–7(d) illustrate one method of field connectorization. For field connectorization, a technician must first locate one of the access points on ribbon cable 136. Once found, the cable is cut at the access point. After the cable is cut adhesive tape layers 130 and 132 may be easily peeled back exposing optical fibers 134 at the access point because the release elements prevent the adhesive side of the tape layer from adhering to the optical fibers. Once the tape layers are peeled back, a connector assembly 140 is then installed onto the exposed fibers. The release elements are then removed from the tape layers and the adhesive side of each tape layer is then secured to the outer surface of the connector assembly. Finally, any excess tape is trimmed off.

FIGS. 8(a) and 8(b) illustrate top plan views of connector body 30 and ferrule 32 mated together. In FIG. 8(a), ferrule 32 is illustrated in its quiescent state with internal spring 78 not compressed. FIG. 8(b) illustrates ferrule 32 being partially retracted toward connector body 30 which in turn compresses spring 78. In this position, any coaxial force if exerted on back end 40 is transmitted to connector body 30 but not to ferrule 32. In this way, pull-proof strain relief is provided to fibers situated in grooves 66 (not shown) of ferrule 32.

Figure 9:
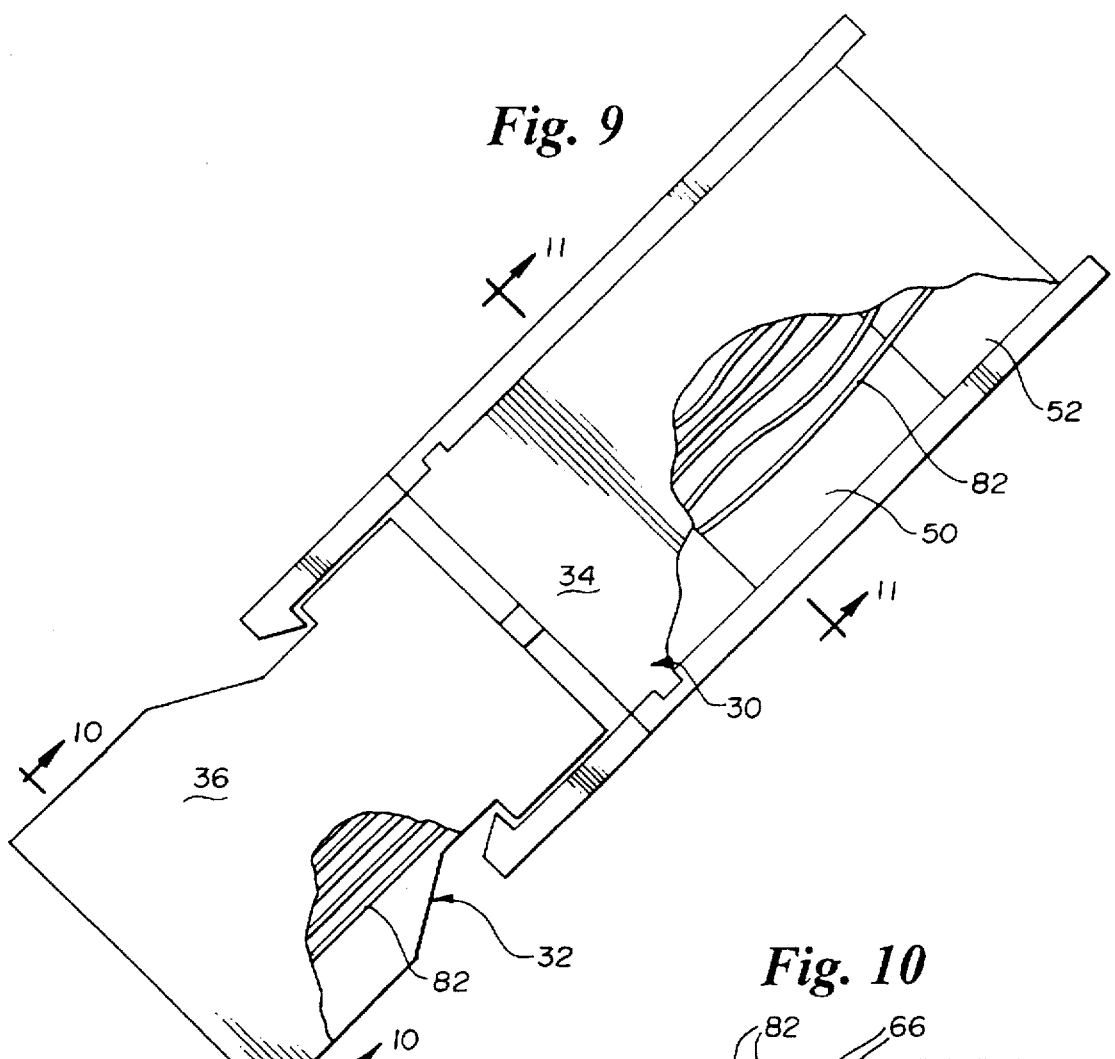
FIG. 9 is a top plan view of a connector assembly having fibers contained therein with portions cut away.
Figure 10:
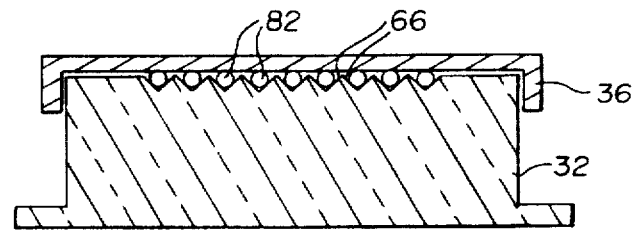
FIG. 10 is a sectional view taken along line 10—10 of FIG. 9.
Figure 11:
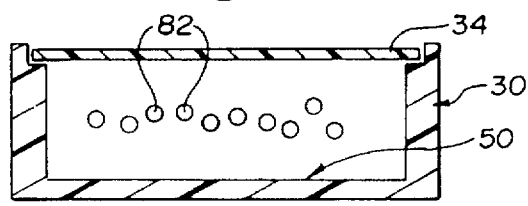
FIG. 11 is a sectional view taken along line 11—11 of FIG. 9.

A further illustration of the pull-proof strain relief feature of the present invention is illustrated schematically in FIG. 9. FIG. 9 is a cut-away top plan view of connector body 30 and ferrule 32 illustrating individual fibers 82 as they are retained beneath connector body cover 34 and ferrule cover 36. Optical fibers 82 are only adhered to connector body 30 at transition platform 52. They are allowed to float between recessed floor 50 and connector cover 34 throughout the remaining length of connector body 30. By having recessed floor 50 recessed a substantial distance from the top of connector body 30, optical fibers 82 are allowed to buckle and bow without interference. This then assists in the pull-proof strain relief feature of the present invention. FIGS. 10 and 11 are cross-sectional views that illustrate the difference between fibers 82 secured tightly below ferrule cover 36 in FIG. 10, and fibers floating between recessed floor 50 and connector body cover 34 in FIG. 11.

FIG. 12 is an exploded perspective view of the connector assembly 28 along with latching shell 92 and a coupling assembly 94. Coupling assembly 94 comprises a latching mechanism 96 and a coupling housing 98. FIG. 13 illustrates a partially assembled assembly wherein connector body 30 and ferrule 32 are secured in latching shell 92 via latching mechanism 96. Latching shell 92, latching mechanism 96 and coupling housing 98 are all preferably made of plastic, but as with connector body 30 and ferrule 32, they could be made of glass, ceramic or other materials.

Latching shell 92 is a substantially rectangular hollow body structure for receiving a substantial portion of connector body 30 and ferrule 32. Latching shell 92 has a top portion 100, front portion 101, sides 102, and rear portion 103. Sides 102 have ramped tabs 104 for facilitating the push-pull latching feature of the present invention. Slots 106 are formed in sides 102 of latching shell 92 through which retention members 49 and stops 51 project. As can be seen, latching shell 92 is wider at rear portion 103 than at front portion 101 to allow retention members 49 and stops 51 to pass through. Top portion 100 has an abutment member 108 positioned to prevent latching shell 92 from being inserted further in coupling housing 98 than desired.

Latching mechanism 96 is a substantially H-shaped dual latch. Latching mechanism 96 has first and second latching ends 110 and 112, respectively. Both first and second latching ends 110 and 112 have a pair of latching arms 114 for engagement in latching shell 92 with retention members 49 of connector body 30. Latching mechanism 96 also has a coupling portion 116 where ferrules 32 are coupled.

Coupling housing 98 houses a single latching mechanism 96 for coupling two connector assemblies 28 together. Coupling housing 98 is a rectangular hollow structure having a pair of slots 118 in the top of the housing for receiving abutment members 108 of latching shells 92. A pair of fastening tabs 120 are also provided to secure coupling housing when desired.

When fully assembled, optical fibers 82 provide strain relief, the pull-proof feature, to the connector, without needing additional strain relief members. When connector assembly 28 is latched into place, ferrule 32 is retracted relative to connector body 30 thus decoupling latching arms 46 of connector body 30 from latching ears 74 of ferrule 32 and providing slack in the fibers within the connector body. This allows a load to be applied to cable 80 and thus to fibers 82 within the cable via tape layers 86 and 88. The load is then transferred to connector body 30 via the adhesive bond between fibers 82 and transition platform 52, and thus to coupling assembly 94 via latching mechanism 96. Finally, the load is transferred to the world via fastening tabs 120 on coupling housing 98. Therefore, the load is transferred from cable 80 to the world all without disturbing ferrule 32 and thus without disturbing the optical coupling.

What is claimed is:

1. A method of manufacturing a fiber optic ribbon cable having a connector assembly formed therein comprising the steps of:
    (a) providing a connector body having a front end and a back end, wherein the connector body comprises a front wall at the front end with an upper surface and a lower surface, a substantially flat transition platform adjacent the back end, a pair of side walls tapering from the front wall to the transition platform, and a floor joining the side walls and extending from the transition platform to the lower surface of the front wall, wherein a latching member and a mounting post project outwardly from the front wall;
    (b) providing a fiber alignment block matable with the connector body, wherein the alignment block comprises an optical interface device surface, a fiber receiving surface with at least one alignment groove, and a connector body engagement surface comprising a retention structure for engaging the latching members of the connector body and a cavity to receive the mounting post on the connector body, wherein the cavity further comprises a spring member which biases the mounting post;
    (c) positioning at least one optical fiber adjacent the fiber receiving surface and the plurality of grooves in the fiber engagement surface of the alignment block;
    (d) retaining the at least one fiber in the receiving channel with a connector body cover;
    (e) retaining the at least one fiber in the grooves formed in the alignment block; and
    (f) sandwiching the at least one fiber and the connector assembly between first and second adhesive tape layers to form a ribbon cable.

2. A method of applying a connector assembly comprising
    a connector body having a front end and a back end, wherein the connector body comprises a front wall at the front end with an upper surface and a lower surface, a substantially flat transition platform adjacent the back end, a pair of side walls tapering from the front wall to the transition platform, and a floor joining the side walls and extending from the transition platform to the lower surface of the front wall, wherein a latching member and a mounting post project outwardly from the front wall;
    an alignment block matable with the connector body, wherein the alignment block comprises an optical interface device surface, a fiber receiving surface with at least one alignment groove, and a connector body engagement surface comprising a retention structure for engaging the latching members of the connector body and a cavity to receive the mounting post on the connector body, wherein the cavity further comprises a spring member which biases the mounting post and wherein the at least one optical fiber is adhered to the connector body at the transition platform and to the alignment block in the alignment groove;
    a connector body cover and an alignment block cover;
    to a fiber tape layers and a pair of release elements disposed between the adhesive tape layers and the at least one optical fiber, the method comprising the steps of:
    (a) locating the release elements on the fiber optic ribbon cable;
    (b) cutting the ribbon optic ribbon cable containing a pair of adhesive tape layers, at least one optical fiber arranged in a generally longitudinal orientation between the pair of cable substantially perpendicular to its longitudinal axis near the midpoint of the release elements;
    (c) peeling back the adhesive tape layers and release elements to expose the at least one optical fiber;
    (d) aligning the connector body and alignment block with the at least one exposed fiber;
    (e) retaining the at least one exposed fiber between the connector body cover and alignment block cover and the connector body and alignment block, respectively;
    (f) removing the release elements from the adhesive tape layers; and
    (g) applying the tape layers to the connector assembly.

3. The method of claim 2 further including the step of trimming away any excess adhesive tape.

* * * * *